MICROWAVE DIRECTIONAL COUPLER HAVING OHMICALLY JOINED OUTPUT PORTS D.C. ISOLATED FROM OHMICALLY JOINED INPUT AND TERMINATED PORTS

Filed Feb. 9, 1966 3 Sheets-Sheet 1

INVENTOR
J. E. DALLEY
BY
ATTORNEY 3,381,244
Patented Apr. 30, 1968

3,381,244

MICROWAVE DIRECTIONAL COUPLER HAVING OHMICALLY JOINED OUTPUT PORTS D.C. ISOLATED FROM OHMICALLY JOINED INPUT AND TERMINATED PORTS

James E. Dalley, Whitfield, Pa., assignor to Bell Telephone Laboratories, Incorporated, New York, N.Y., a corporation of New York Filed Feb. 9, 1966, Ser. No. 526,085
4 Claims. (Cl. 333—10)

This invention relates to electromagnetic wave couplers and, more particularly, to such couplers of the directional type for use in strip line and printed circuit configurations.

In a copending U.S. patent application of R. S. Engelbrecht, Ser. No. 407,745, filed Oct. 30, 1964, there is disclosed a balanced strip line transistor amplifier having a flat gain characteristic over a wide frequency bandwidth with low intermodulation distortion. Much of the advantageous character of this type of amplifier results from the use of directional couplers at both the input and output of each amplifier stage. With such an arrangement, a high degree of impedance match between stages is possible with a resulting minimum of losses due to reflections at mismatches.

The present invention will be described as used with such a balanced amplifier, although, of course, it is readily adaptable to other circuit configurations.

The conventional type of directional coupler that is disclosed in the aforementioned copending application at the amplifier input converts a single channel input signal into a pair of signals 90° out of phase with each other, each having approximately one-half the input signal magnitude. At the output, two signals are combined to produce a single channel output. In both cases, there is a direct electrical connection between one of the coupler input ports and one of the coupler output ports. As a consequence of this direct connection, it is necessary to utilize blocking capacitors and bias filter networks to provide direct current isolation between stages. In addition, to insure uniformity of propagation for the odd and even modes, a certain precision in the manufacture of the coupler must be observed.

The present invention makes use of different propagation constants for the odd and even modes within the coupler to achieve electrical isolation between amplifier stages, thereby eliminating the necessity of blocking capacitors and at least some of the bias filtering network, thereby reducing the number of components per amplifier stage by as much as thirty percent. In addition, the need for equal mode propagation velocities is eliminated, thereby eliminating the ultra precision requirements in the manufacture of the coupler.

In an illustrative embodiment of the invention, the coupler comprises a pair of thin film conductors deposited on a hard dielectric substrate and spaced from a pair of ground planes with a dielectric medium such as air of dielectric constant less than that of the substrate. The conductors are of substantially the same dimensions and are coextensive on opposite sides of the substrate. With such a configuration, the effective dielectric constant for the even mode of propagation is substantially unity while that for the odd mode is greater than unity. As a consequence, the odd mode propagates more slowly than the even mode and the electrical length of the coupler is greater for the odd mode.

A first pair of ports is connected to one of the thin film conductors, with one of the ports terminated in a resistance, and a second pair of ports is connected to the other of the conductors. When a signal is applied to the unterminated port of the first pair, equal signals, each approximately one-half the magnitude of the input signal, appear at the second pair of ports, 90° out of phase with each other.

The arrangement is reversible in that signals applied to the second pair of ports 90° out of phase add to produce a single output at the unterminated port of the first pair.

It is a feature of the present invention that the coupler has a non-homogeneous dielectric which produces unequal phase velocities for the odd and even modes of propagation, thereby permitting D.C. isolation of the input ports from the output ports.

The various features of the present invention will be more readily apparent from the following detailed description taken in conjunction with the accompanying drawings, in which:

FIG. 1 is a schematic diagram of an amplifier stage such as is disclosed in the aforementioned R. S. Engelbrecht application;

Figure 1:
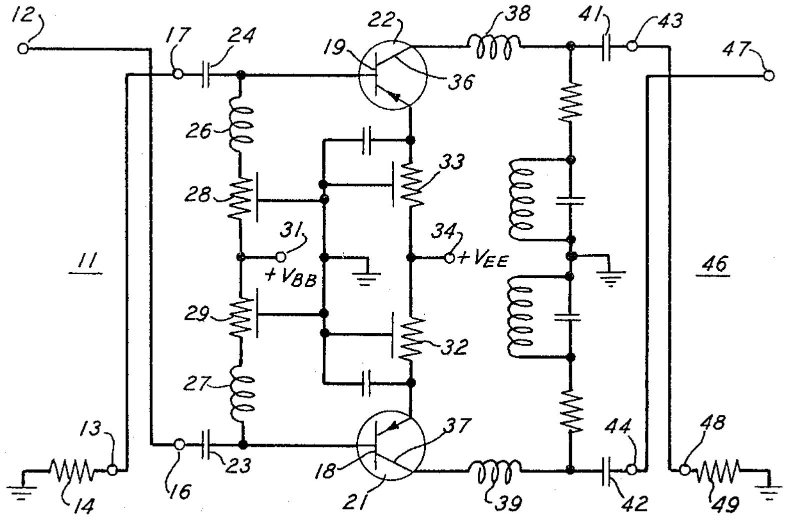

For purposes of a clear understanding of the advantages of the present invention, it will be described in the following as incorporated into the balanced amplifier disclosed in the aforementioned copending application of R. S. Engelbrecht. In FIG. 1 there is shown a schematic diagram of a single stage of that amplifier, which comprises an input directional coupler 11 having a signal input port 12 and a port 13 terminated in an impedance 14 ($Z_0$) which matches approximately the driving or source impedance. Where the source is another amplifier stage, impedance 14 matches the output impedance of that stage. Coupler 11 also has a pair of output ports 16 and 17 which are D.C. coupled to ports 12 and 13 respectively. Ports 16 and 17 are connected respectively to bases 18 and 19 of a pair of transistors 21 and 22 through D.C. blocking capacitors 23 and 24. Capacitors 23 and 24 are necessary because of the direct connection of port 16 to port 12 and port 17 to port 14 which otherwise would create a direct current path through the stages of the amplifier. In order that radio frequencies may be kept out of the bias supply, a pair of meander line chokes 26 and 27 and R-F filters 28 and 29 are interposed between the bias input 31 and bases 18 and 19. Chokes 26 and 27 prevent the input signals from reaching port 31 and filters 28 and 29 effectively ground whatever radio frequencies do get through. In a like manner filters 32 and 33 eliminate R-F from the emitter bias supply at port 34.

The collectors 36 and 37 of transistors 22 and 21 respectively are connected through impedance compensating inductances 38 and 39 and blocking capacitors 41 and 42 to the ports 43 and 44 of an output coupler 46. Coupler 46 combines the signals from transistors 21 and 22 into a single output at output port 47. The other output port 48 is terminated in a matching impedance 49 ($Z_0$).

In the arrangement of FIG. 1, coupler 11 divides an input signal into two signals that are each one half of the input signal and are 90° out of phase with each other. Coupler 46, on the other hand combines two signals having a 90° phase difference into a single signal equal to the sum of the two inputs.

Figure 2:
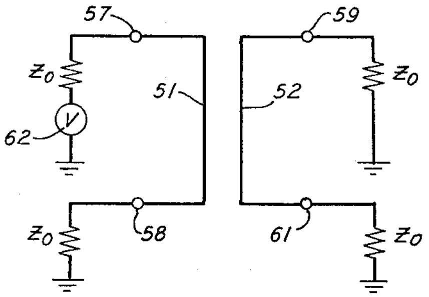
FIG. 2 is a schematic diagram of the coupler of the invention.
Figure 3:
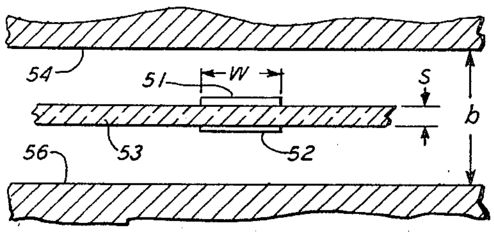
FIG. 3 is a cross section of a strip line configuration of the coupler of the invention.

In FIG. 2 there is shown a schematic diagram of the coupler of the present invention and in FIG. 3 a cross section view in the center of the coupling region. The coupler comprises a pair of strip lines 51 and 52 deposited on either side of a hard ceramic substrate 53 of material such as alumina having a dielectric constant greater than that of air. A pair of ground planes 54, 56 are spaced from substrate 53, the intervening space being filled by a medium such as air having a dielectric constant less than that of the substrate 53, conductor 51 is terminated at its ends in a pair of ports 57, 58, and conductor 52 is terminated in ports 59 and 61.

For purposes of the following discussion, ports 58, 59, and 61 are shown terminated in the characteristic $Z_o$ of the coupler, while port 57 is driven with an R-F voltage V, from a source 62 having an impedance $Z_o$.

In an arrangement such as is depicted in FIGS. 2 and 3, an input signal at port 57 propagates along the line 51 between ports 57 and 58 as a wave having both odd and even modes of propagation. In the even mode of propagation the potential on lines 51 and 52 is the same at all corresponding points, hence there is virtually no electric field existing between the lines, i.e., through substrate 53. On the other hand, for the odd mode, conductors 51 and 52 are at opposite polarities and there is a strong electric field existing between them and through substrate 53. As a consequence the effective dielectric constant $\epsilon_{re}$ for the even mode is less than the effective dielectric constant $\epsilon_{ro}$ for the odd mode, and the even mode propagates at a greater velocity than the odd mode. Because the velocities of propagation are different, the electrical length of the coupler is different for the two modes, and it can be shown that $$\beta_o L = \beta_e L + N\pi \tag{1}$$

where $\beta_o$ and $\beta_e$ are the propagation constants of the odd and even modes respectively, L is the length of the coupler, and N is an integer. Because the electrical lengths are different, the effective impedances $Z_{oe}$ and $Z_{oo}$, for the event and odd modes respectively, of the coupler differ from each other and from the ideal impedance $Z_o$, but are related by $$Z_o = \sqrt{Z_{oe} Z_{oo}} \tag{2}$$

Figure 4:
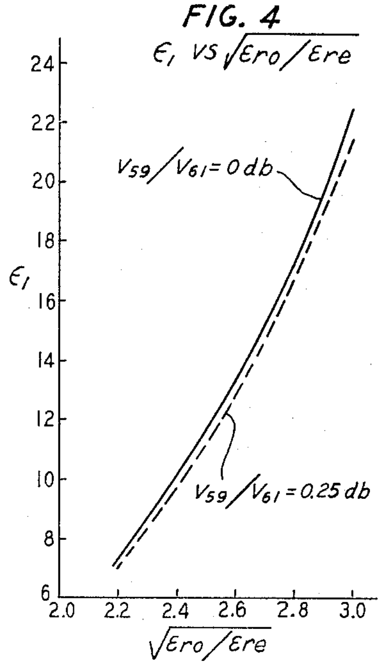
FIGS. 4, 5 and 6 are graphs of various coupler parameters useful in designing a specific coupler.

As a result of this difference in the behavior of the odd and even modes and the lack of an impedance match, outputs appear at both ports 59 and 61 when a signal is applied at port 57, and there is complete D.C. isolation between lines 51 and 52.

Where the coupler is used in a balanced amplifier such as disclosed in the aforementioned Engelbrecht application, it is necessary that the outputs at ports 59 and 61 be substantially equal and that return loss, or absorption at port 58, be maximized. This necessitates certain considerations in the design of the coupler. In such an arrangement, $Z_o$ is known from the amplifier impedance, and we designate as $f_1$ the frequency of infinite return loss and $f_2$ the center band frequency of operation. The dielectric constant $\epsilon_1$ of the substrate 53 is known, from which the ratio $$\sqrt{\epsilon_{ro}/\epsilon_{re}}$$

can be determined where $\epsilon_{ro}$ is the effective dielectric constant for the odd mode and $\epsilon_{re}$ is the effective dielectric constant for the even mode. FIG. 4 is a chart of $\epsilon_1$ versus the term $$\sqrt{\epsilon_{ro}/\epsilon_{re}}$$

for two values of coupling, as determined mathematically. The solid line relates to equal voltages at ports 59 and 61, while the dotted line relates to voltages at 59 and 61 whose ratio is 0.25 db, or 0.25 db overcoupling.

We define a coupling factor A as $$A = \sqrt{\frac{Z_{oe}}{Z_{oo}}} \tag{3}$$

and a factor $A_1$ as the value of A for equal coupling where $f_1 = f_2$. From Equations 2 and 3 we obtain $$Z_{oo} = \frac{Z_o}{A} \tag{4}$$

and $$Z_{oe} = AZ_o \tag{5}$$

Figure 6:
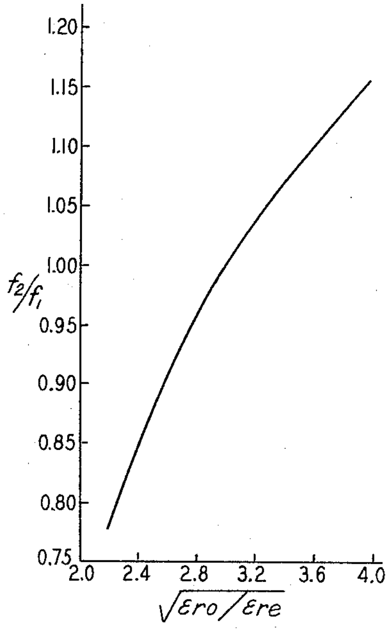
Figure 5:
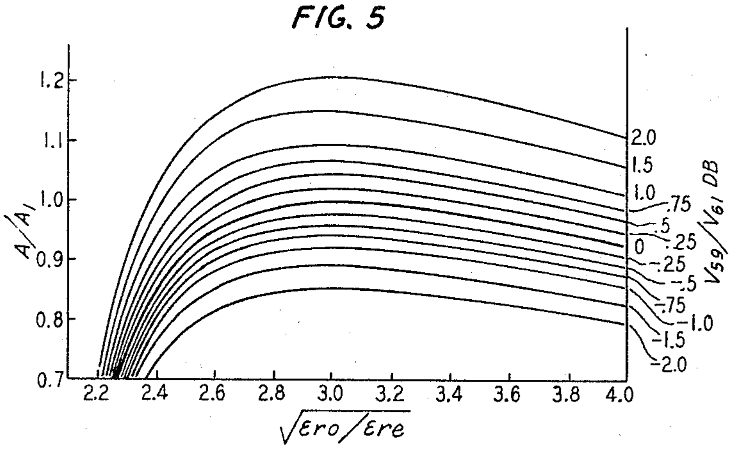

In FIG. 5 there is a series of curves which give the value of the ratio $A/A_1$ as a function of $$\sqrt{\frac{\epsilon_{ro}}{\epsilon_{re}}}$$

for various degrees of coupling. For present purposes we are concerned with the $V_{59}/V_{61} = 0$ db curve. From FIG. 5 the value of the ratio $A/A_1$ is ascertained. The factor $A_1$ is given by $$A_1 = \frac{1}{\sin \varphi_o} \pm \sqrt{\frac{1}{\sin^2 \varphi_o} + 1} \tag{6}$$

where $$\varphi_o = \frac{\pi}{\sqrt{\epsilon_{ro}/\epsilon_{re}} - 1} \tag{7}$$

and, therefore, A can be readily determined. Once A is known $Z_{oo}$ and $Z_{oe}$ can be found from Equations 4 and 5. FIG. 6 is a plot of the ratio $f_2/f_1$ versus the ratio $$\sqrt{\frac{\epsilon_{ro}}{\epsilon_{re}}}$$

as determined mathematically. When the ratio $$\sqrt{\frac{\epsilon_{ro}}{\epsilon_{re}}}$$

and $f_2$ are known, $f_1$ is readily determinable from the graph of FIG. 6. It can be shown that the length L of the coupling region defined by conductors 51 and 52 is given by $$L = \frac{\varphi_e}{2\pi f_1 \eta \epsilon_o \sqrt{\epsilon_{re}}} \tag{8}$$

where L is in meters, $\varphi_e$ in radians, and $f_1$ in c.p.s., $\eta$ is the free space impedance, $\epsilon_o$ is the free space permittivity, and $\epsilon_{re}$ is the effective even mode dielectric constant which, in the configuration of FIG. 3, is approximately unity.

The remaining dimensions of the coupler, such as the ground plane spacing $b$, the substrate thickness $s$, and the conductor width W are not uniquely determined from the foregoing. They are determined by the even and odd mode capacitances, which in turn are given by $$\frac{C_e}{\epsilon_o} = \frac{\eta\sqrt{\epsilon_{re}}}{Z_{oe}} \tag{9}$$

and $$\frac{C_o}{\epsilon_o} = \frac{\eta\sqrt{\epsilon_{ro}}}{Z_{oo}} \tag{10}$$

Since $C_o$ and $C_e$ are, therefore, readily determinable, it is within the purview of a worker in the art to proportion $b$, $s$, and W to achieve the desired values.

The foregoing discussion represents a summary of an exceedingly long and complex mathematical development. With Equations 1 through 10 and FIGS. 4 through 6, it is possible for a worker to construct the coupler of the invention for the particular application desired.

Figure 7:
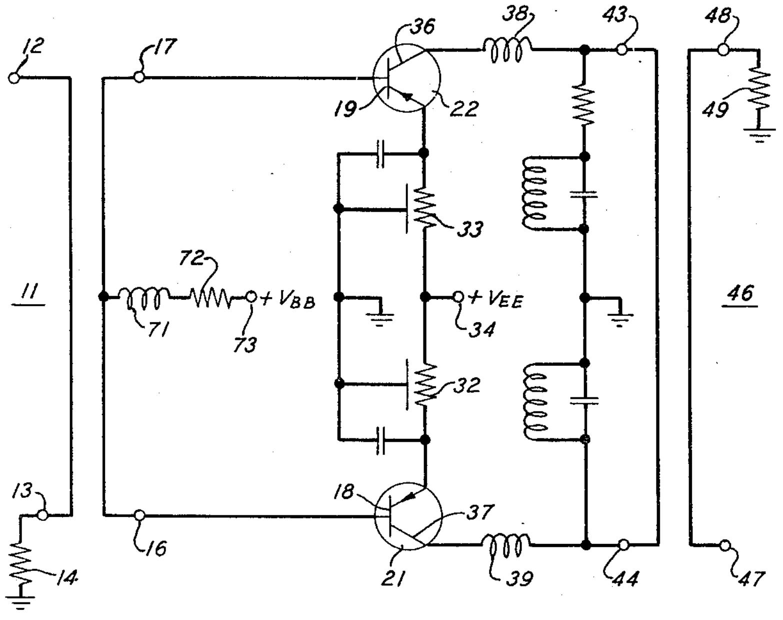
FIG. 7 is a schematic diagram of a balanced amplifier utilizing couplers of the present invention.

In FIG. 7, there is shown a schematic view of the balanced amplifier of FIG. 1 utilizing the coupler of the present invention. For simplicity, elements in FIG. 7 having their equivalent in FIG. 1 are given the same reference numerals.

The amplifier stage of FIG. 7 comprises an input coupler 11 embodying the principles of the present invention having a signal input port 12 and a port 13 terminated in an impedance 14 ($Z_o$) which matches the amplifier impedance. Coupler 11 has a pair of output ports 16 and 17 which are connected to each other and D.C. isolated from ports 12 and 13. Ports 16 and 17 are connected, respectively, to the bases 18 and 19 of a pair of transistors 21 and 22. Radio frequencies are kept out of the bias supply by a meander line choke 71 and an R-F filter 72 connected between bias input 73 and the coupler 11, as shown.

Collectors 36 and 37 of transistors 22 and 21, respectively, are connected through impedance compensating inductances 38 and 39 to ports 43 and 44 of an output coupler 46. Coupler 46 combines the signal from transistors 21 and 22 into a single output at output port 47. The other output port 48 is terminated in a matching impedance 49 ($Z_o$).

A comparison of the circuits of FIGS. 1 and 7 reveals that several circuit elements in FIG. 1 have been eliminated in FIG. 7. Thus blocking capacitors 23, 24, 41 and 42 are no longer in the circuit and the chokes 26, 27 and filters 28, 29 have been replaced by a single choke 71 and filter 72. In any circuit arrangement it is desirable to eliminate as many components as possible. In the arrangement of FIG. 7, approximately thirty percent of the components of FIG. 1 have been eliminated through the use of the coupler of the invention.

Utilizing the principles of the present invention, including the condition that $\epsilon_{ro} > \epsilon_{re}$, substantially equal outputs (within 0.5 db) over an octave and more frequency variation have easily been obtained using readily available materials. It has been found that an optimum for most applications is achieved when $$\sqrt{\epsilon_{ro}/\epsilon_{re}} = 3 \qquad (11)$$

but that variations from this value still produce quite satisfactory results.

The foregoing discussion is directed to a preferred embodiment of the principles of the invention. The application of these principles to other embodiments may occur to workers in the art without departure from the spirit and scope of the invention.

What is claimed is:

1. A microwave frequency directional coupler comprising first and second spaced ground plane members, a pair of planar conductors mounted in opposed relationship on either side of a dielectric substrate member intermediate said ground planes, first and second ports connected to one of said pair of conductors and third and fourth ports connected to the other of said pair of conductors, an inhomogeneous dielectric medium including said substrate filling the space between the ground planes giving rise to both even and odd modes of propagation along said coupler upon application of a signal to one of said ports, the parameters of said coupler being so related that $$\frac{\epsilon_{ro}}{\epsilon_{re}} => 1$$

where $\epsilon_{ro}$ is the effective dielectric constant in the coupling region for the odd mode and $\epsilon_{re}$ is the effective dielectric constant for the even mode, the length of the coupling region is given by $$L = \frac{\varphi_o}{2\pi f_1 \eta \epsilon_o \sqrt{\epsilon_{re}}}$$

where $\eta$ is free space impedance, $f_1$ is the frequency of infinite return loss, $\epsilon_o$ is free space permittivity, and $\varphi_o$ is given by $$\varphi_o = \frac{\pi}{(\sqrt{\epsilon_{ro}/\epsilon_{re}}) - 1}$$

the coupler port conductively connected to the port to which signals are applied being terminated in an absorbing impedance, and the remaining two ports being output ports.

2. A microwave frequency directional coupler as claimed in claim 1 in which the effective capacitances are given by $$\frac{C_e}{\epsilon_o} = \frac{\sqrt{\epsilon_{re}}}{Z_{oe}}\eta$$

and $$\frac{C_o}{\epsilon_o} = \frac{\sqrt{\epsilon_{ro}}}{Z_{oo}}\eta$$

where $C_e$ is the even mode capacitance, $C_o$ is the odd mode capacitance, $Z_{oe}$ is the even mode impedance, and $Z_{oo}$ is the odd mode impedance.

3. A microwave frequency directional coupler as claimed in claim 1 wherein $$\sqrt{\frac{\epsilon_{ro}}{\epsilon_{re}}} = 3$$

4. A microwave directional coupler for producing substantially equal outputs at a pair of spaced output ports upon application of a microwave signal to a single input port, said output ports being conductively coupled together and insulated from said input port, said input port being conductively connected to a terminated port and spaced therefrom, the space between said output ports and between said input and said terminated port defining a coupling region, and means for producing different propagation and coupling characteristics for the odd and even modes of propagation of the applied signal within the coupling region comprising an inhomogeneous dielectric medium filling the coupling region.

References Cited

UNITED STATES PATENTS

| | | | |
|---|---|---|---|
| 3,098,983 | 7/1963 | Oliner | 333—10 |
| 3,237,130 | 2/1966 | Cohn | 333—10 |

HERMAN KARL SAALBACH, *Primary Examiner.*

M. NUSSBAUM, *Assistant Examiner.*